United States Patent

Miyagawa

[15] 3,667,367
[45] June 6, 1972

[54] SHUTTER RELEASE TIME PRELIMINARY INDICATION DEVICE FOR A PHOTOGRAPHIC CAMERA HAVING A BUILT-IN SELF-TIMER

[72] Inventor: Fumihiro Miyagawa, Tokyo, Japan
[73] Assignee: Ricoh Co., Ltd., Tokyo, Japan
[22] Filed: July 27, 1970
[21] Appl. No.: 58,414

[30] Foreign Application Priority Data

Aug. 21, 1969 Japan..................................44/79663

[52] U.S. Cl............................................................95/53.3
[51] Int. Cl. .........................................................G03b 17/38
[58] Field of Search..................................................95/53.3

[56] References Cited

UNITED STATES PATENTS 3,223,013 12/1965 Rentschler............................95/53.3
976,217 11/1910 Roesner................................95/53.3

Primary Examiner—Joseph F. Peters, Jr.
Attorney—Henry T. Burke, Robert Scobey, Robert S. Dunham, P. E. Henninger, Lester W. Clark, Gerald W. Griffin, Thomas F. Moran, Howard J. Churchill, R. Bradlee Boal, Christopher C. Dunham and Ivan S. Kavrukov

[57] ABSTRACT

A photographic camera having a self-timer which can be set to release the shutter after a predetermined time delay, wherein the improvement is in a device operative after the setting of the self-timer to indicate when the shutter is about to be released. A level connected to the self-timer shaft trips a switch a few seconds before the shutter is released and turns on a lamp visible from the front of the camera. The lamp indicates that the shutter is about to be released and serves to alert the persons who are about to be photographed.

4 Claims, 3 Drawing Figures

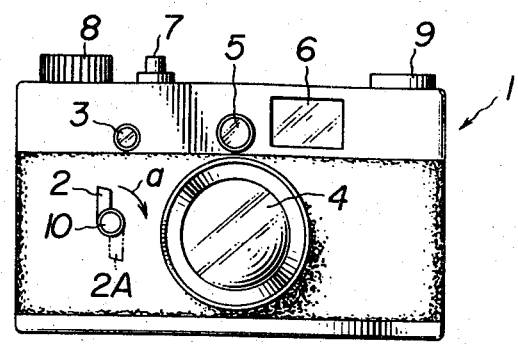
FIG. 1
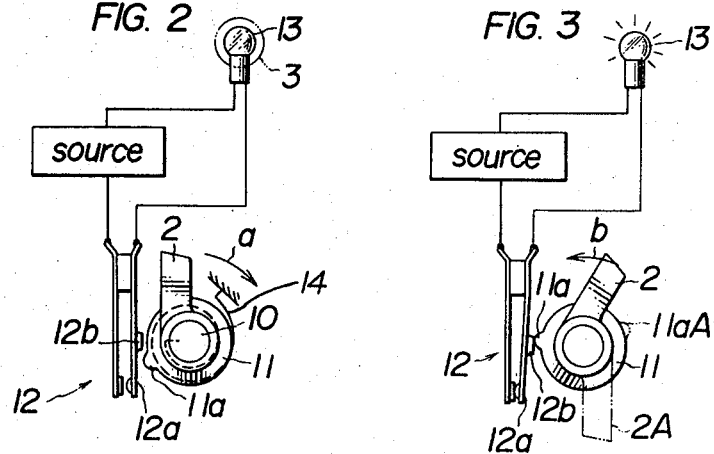
INVENTOR.
Fumihiro Miagawa
BY
Henry T. Burke

SHUTTER RELEASE TIME PRELIMINARY INDICATION DEVICE FOR A PHOTOGRAPHIC CAMERA HAVING A BUILT-IN SELF-TIMER

BACKGROUND OF THE INVENTION

Heretofore, when a picture is taken by using a self-timer built in a photographic camera, no method has been available other than watching the movement of the set lever of the self-timer to follow the operation of the self-timer and to find out when the shutter is about to be released. It is often difficult to see the movement of the set lever, particularly if the person who is being photographed is some distance away from the camera. The difficulty is increased when he is not familiar with set lever operations. This often results in his looking away or blinking when the shutter is released.

SUMMARY OF THE INVENTION

This invention relates to a device, in a photographic camera having a built-in self-timer, for indicating shutter release time when the self-timer is used to release the shutter.

The invention has as its object the provision of a shutter release time preliminary indication device for a photographic camera having a built-in self-timer which device is operative to light a lamp immediately before the shutter is released so as to inform a person who is to be photographed of the imminent shutter release time and to help that person prepare for the photograph.

BRIEF DESCRIPTION OF THE DRAWINGS

FIG. 1 is a front view of a photographic camera having a self-timer in which the present invention is incorporated;

FIG. 2 is a front view of one embodiment of the invented shutter release time preliminary indication device; and FIG. 3 is a front view showing the manner of operation of the device of FIG. 2.

DESCRIPTION OF A PREFERRED EMBODIMENT OF THE INVENTION

In FIG. 1, 1 is a photographic camera having a self-timer in which the present invention is incorporated, 2 is a self-timer set lever mounted in the front of the camera 1, 3 is an indication window, 4 is a camera lens, 5 is a light receiving window of an exposure control device, 6 is a finder window, 7 is a shutter button, 8 is a film advance knob, and 9 is a film rewind knob. The set lever 2 is secured to the front end of a shaft 10 connected to a spiral spring 14 in the camera. By turning manually the set lever 2 approximately 180° in the direction of the arrow *a* the lever is brought to the dotted line position 2A and the spiral spring is brought to a loaded state. If a set lever release member (not shown) is pushed, then the spiral spring 14 is released from the loaded state and the shaft 10 is rotated by the spring in a direction opposite to the direction of the arrow *a*. In the final stages of the rotation of the shaft 10, a release mechanism (not shown) in the camera is actuated, with a result that the shutter (not shown) of the camera is released. During this process, the set lever 2 rotates in the same direction as the shaft 10 (in the direction opposite to the direction of the arrow *a*), to be restored ultimately to the solid-line position as shown. The aforementioned operation of the set lever is known.

A disc 11 having at its peripheral edge a projection 11a as shown in FIG. 2 is secured to the portion of the shaft 10 which is disposed inside the camera. The disc 11 is adapted to rotate with the shaft 10 as a unit. Disposed in the path of travel of the projection 11a of the rotating disc 11 is a movable contact 12a of a normally open switch 12 for turning on and off an indication lamp 13 arranged inside the indication window 3.

If the set lever 2 in FIG. 2 is turned in the direction of the arrow *a* approximately 180° from the position it occupies in the figure, the lever 2 and the projection 11a of the disc 11 move to dotted line positions 2A and 11A respectively as shown in FIG. 3. Then, if the self-timer is released, the shaft 10 begins to rotate in the direction of the arrow *b* shown in FIG. 3 and the lever 2 and projection 11a also begin to move in the same direction as the shaft 10. A few seconds before termination of the rotary movement of the shaft 10 (i.e., a few seconds before shutter release time), the lever 2 and the projection 11a of the disc 11 pass by the solid-line position shown in FIG. 3. At this time, the projection 11a engages and pushes an engaging portion 12b of the moveable contact 12a of the switch 12 to move the contact 12 leftwardly in FIG. 3 so as to close the switch 12 momentarily. The closing of the switch 12 lights the indication lamp 13 and keeps the lamp lit for a short while, indicating that the shutter will soon be released. The fact that the light 3 is on tells the person to be photographed that the shutter is going to be released, so that he can pose for shooting. The lamp may be kept lit till the shutter is released. After passing by the solid-line position shown in FIG. 3, the projection 11a is released from engagement with the movable contact 12a, and the indication lamp 13 is turned off. Upon releasing the shutter, the shaft 10 stops rotating and the lever 2 and the disc 11 are restored to their starting positions shown in solid line in FIG. 2.

The relative positions of the projection 11a and the movable contact 12a of the switch 12 can be set as desired. Assuming that the self-timer is set to count 15 seconds before the shutter is released when the lever 2 is moved through 180°, the lamp 13 can be turned on 1 to 5 seconds before shutter release time and kept lit till the shutter is released. The projection 11a will momentarily close the switch 12 when the lever 2 is set. However, this will cause no trouble in taking pictures. In the embodiment shown and described, the movable contact 12a has the engaging portion 12b. The engaging portion 12b may be formed by bending the movable contact; or the engaging portion 12b may be omitted altogether, because it is not absolutely necessary. The disc 11 may be replaced by a suitable lever mechanism for actuating the movable contact 12a of the switch 12. The indication lamp 13 should be bright enough to be seen at a distance of about 10 meters even in the daytime. Experiments have shown that lamps of a very low wattage can serve the purpose. In the shutter release time preliminary indication device according to this invention, the indication lamp 13 may be mounted in any convenient position near the outer surface of the camera so long as it can be clearly seen from the front. A power source for an automatic exposure control device mounted in the camera or a power source for an electric motor in the case of a camera using the motor for advancing film may be used for the power source of the indication lamp 13 according to this invention.

From the foregoing description, it will be appreciated that the shutter release time preliminary indication device for a photographic camera having a built-in self-timer serves to attract the attention of a person to be photographed to the camera at the right moment, to assure that the person who is being photographed is aware of the exact time of shutter release.

Thus a photographic camera having a self-timer which can be set to release the shutter after a predetermined time delay is improved by a device operative after the setting of the self-timer to indicate when the shutter is about to be released. The device serves to alert the people who are being photographed to the fact that the picture is about to be taken. The device includes a series circuit comprising a voltage source 15, a lamp 13 and a normally open off-on switch 12. The device further includes a cam 11a rigidly connected to the shaft 10 of the self-timer for rotation therewith. The self-timer is set by rotating its shaft 10 clockwise from its original position over a predetermined angle at which it is released to begin measuring the predetermined time delay after which it releases the shutter. The device further includes means responsive to setting the self-timer to begin measuring a time span shorter than the time delay of the self-timer and to indicate the end of said time span, the means being in the form of a cam 11a which rotates with the shaft 10 of the self-timer. The cam 11a has a cam set position which corresponds to the shaft 10 set position and returns therefrom, with the shaft 10, to a time span end indicating position which occurs a few seconds before the shaft returns to its original position at which it releases the shutter. The normally open switch 12 includes a resilient contact 12a which is normally in a first contact position at which the switch is open circuit. When the cam 11a is in its time span end indicating position, the resilient contact 12a is moved from its first contact position to its second contact position in which the switch 12 is closed circuit and turns on the lamp 13 to indicate that the shutter is about to be released.

I claim:

1. A shutter release time preliminary indication device for a photographic camera with a built-in self-timer which includes a timer set lever positioned outside the camera body and adapted for manual rotation from an original position to a set position, a timer shaft rigidly connected to said timing lever for rotation therewith, said timer shaft extending into the camera body and provided with a timing bias spring for rotating the timer shaft and the timer set lever from said set position to said original position, said shutter release time preliminary indication device comprising:
   a. a disk rigidly connected to said timing shaft for rotation therewith between an original position and a set position corresponding to the original position and the set position respectively of the timer set lever, said disk having a camp projection extending radially outwardly of the disk;
   b. a normally open switch having a resilient moveable contact biased to an open position at which the switch is open, said resilient movable contact having an engaging portion adapted to engage with the cam projection of the disk when the disk is in a contact engaging position intermediate said set position and said original position, the engagement between the cam projection and the engaging portion moving said resilient moveable contact from its open position to a closed position at which the contact is closed, said resilient moveable contact being disengaged from the cam projection and remaining in its open position at all positions of the disk other than said contact engaging position;
   c. a voltage source;
   d. a lamp; and
   e. means connecting said voltage source, said lamp, and said contact in an electrical series circuit, whereby the lamp is electrically connected across the voltage source and lights up first when the disk passes through said contact engaging position while the timing set lever is manually rotated from its original position to its set position and second when the disk passes through said contact engaging position while the timing shaft bias spring returns the timing set lever from its set position to its original position, said second lighting up of the lamp 13 indicating that the timer set lever is about to return to its original position and that the camera shutter is about to be released.

2. A shutter release time preliminary indication device as in claim 1 wherein said engaging portion of the resilient moveable contact comprises a cam follower projection extending from the moveable contact toward said cam projection of the disk for engagement therewith when said disk is in its contact engagement position.

3. A shutter release time preliminary indication device as in claim 1 wherein said lamp is positioned in the camera body and wherein the camera front face is provided with a window through which said lamp is visible.

4. A shutter release time preliminary indication device as in claim 1 wherein said timer set lever rotates through an angle of approximately 180° in its travel between its initial and set positions.

* * * * *